3,484,254
BERRY AND FRUIT TREATING PROCESS
Richard G. Peterson and Emanuel B. Jaffe, Modesto, Calif., assignors to E & J Gallo, Winery, Modesto, Calif.
No Drawing. Filed June 9, 1966, Ser. No. 556,267
Int. Cl. A231 1/02
U.S. Cl. 99—105                                                8 Claims

ABSTRACT OF THE DISCLOSURE

Treatment of fruit and berry pomace with sulfur dioxide carried in a solvent to extract natural varietal color and flavor constituents without attendant removal of undesirable color and flavor constituents.

---

This invention relates generally to a treating process for fruits and berries to obtain the maximum quantity of desirable natural constituents therefrom. More particularly, this invention relates to the treatment of pigmented fruits and berries to extract from the pulp and skins thereof the natural color and flavor constituents contained therein without attendant removal of undesirable color and flavor constituents therefrom. Still more particularly, this invention relates to a process for treating the pulp and skins of anthocyanin and other pigmented fruits and berries to effect thorough color pigment and flavor constituent removal therefrom.

Hereinafter, by way of specific example, reference will be directed to the process of this invention employed in the treatment of grapes during the production of grape juice, grape juice concentrate, and wine. However, it should be understood that the process of this invention is also effective in conjunction with the processing of berry and fruit varieties other than grapes which are commonly employed in the production of juices, juice concentrates, and wines. In this regard, this process has been found highly effective in the processing anthyocyanin pigmented fruits and berries, of which grapes are typical. Other such pigmented fruits, by way of example, with which this process may suitably be employed include blackberries, loganberries, cherries and the like.

The process to be described is employable in a treating operation either before or after fermentation of the fruits or berries has been initiated. When employed prior to fermentation, the resultant product is a non-alcoholic fruit or berry juice, or juice concentrate, usable as such. When employed after fermentation has been initiated, the resultant product is an alcoholic juice or juice concentrate usable in further wine production procedures.

Hereinafter, the liquid product obtained from the pulp and skins (pomace) of the fruits or berries being treated will be referred to as a "juice concentrate." It should be understood, however, that the term "concentrate" is intended to include liquid products commonly termed juices which have a dilute consistency and high water content, as well as liquid products in which the natural fruit or berry character is highly concentrated, and which therefore more accurately reflect use of the term "concentrate."

In the production of juice, juice concentrate, or wine, from fresh grapes, the grape pomace generally includes a large proportion of highly desirable color pigment constituents and flavor constituents which are characteristic of the particular grape variety being processed and which heretofore were largely lost during standard processing operations. This has been true to a large extent because pomace also generally includes various undesirable constituents, particularly those which impart a bitter or astringent taste and off-aroma to the resultant product, which are removed by conventional processing operations along with the desirable constituents. Such undesirable constituents further have the undesirable ability to accelerate decomposition of the juice concentrate or wine with the passage of time when the juice or wine containing the same is bottled.

The improved process of this invention permits recovery of the unique color pigment constituents and unique flavor constituents common only to a particular grape variety, which constituents are unavailable from any source other than fresh grapes of that particular variety. Such recovery, importantly, is not accompanied by undesirable inclusion of off-flavor or off-aroma characteristics with the end product thus obtained from the pomace.

Furthermore, this process is not limited to utilization in the production of any particular class or type of juice concentrate or wine and has utility in the production of all juice concentrate and wine types. For example, sweet wines, dry wines, dessert wines, special natural wines all may be produced by utilizing this invention. However, this invention does have greater applicability to the treatment of certain grape varieties than others. As noted previously, the process is particularly effective in the treatment of anthocyanin pigmented grapes in which the varietal color pigment constituents and flavor constituents are most securely bound up in the pulp and skin portions of the grapes which make up the pomace thereof.

By way of brief summary, this invention involves the treatment of grape pomace with a sulfite, specifically sulphur dioxide carried in a suitable solvent, in a simple extraction procedure which is readily included as part of a grape treating process commonly employed in commercial juice and wine production operations. The pomace, after the grapes have been crushed and the pomace has been separated from the natural juices thereof, is treated with a solvent which contains sufficient sulphur dioxide to positively arrest or preclude fermentation of the pomace while simultaneously counteracting the characteristics of the undesirable constituents of the pomace, so that the desirable constituents of the pomace may be dissolved into solution by the solvent.

The process of this invention differs from prior known processes in which sulphur dioxide has been used in that heretofore sulphur dioxide has been used in small quantities and for the specific purpose of restricting the growth of wild yeast naturally found in fruits and berries employed for wines, particularly grapes. That is, heretofore, sulphur dioxide was added to crushed grapes or juice only in small quantities which would not inhibit fermentation thereof but which would inhibit wild yeast growth. The process of this invention, in distinction, in no way relates to fermenting of the pomace being treated but rather to the preclusion of such fermentation while the desirable color and flavor removal is being effected.

In the treatment of grapes in juice and wine production there are three principal goals sought by the physical separation of juice and pomace: first, to obtain the maximum possible yield of juice per unit weight of grapes; second, to effect maximum possible separation of soluble desirable constituents from insoluble solid portions of the grapes, transferring such soluble constituents into the separated juice portions by dissolving; and third, to minimize or obviate the inclusion of soluble undesirable constituents in the separated juice portions. The desirable soluble constituents generally include the sought after color and flavor agents of the grapes while the soluble undesirable constituents generally include the chemical class of polyphenolic compounds commonly known as tannins. The characteristics of the undesirable tannins are well known in the trade and usually impart taste and aroma characteristics to the juice or wine which are commonly referred to as bitter, astringent, sour, or stemmy.

A certain proportion of both the desirable and undesirable soluble constituents of the grape occur naturally in solution in the juice of the whole ripe berry. However, the vast majority of both occur in a state which cannot properly be termed either dissolved or undissolved in that they are closely associated with tiny local volumes of juice but also are frequently firmly associated with tiny local areas of solids which make up portions of the pulpy body of the grapes. By way of example, the natural anthocyanin pigment of most red grapes is found mainly in the cells which make up the skins of the grapes, while a very small percentage thereof is found already in solution in the readily removable juice of the grapes.

Because such pigment is closely tied up with the skins of such grapes, it is possible to obtain white juice or wine from red grapes simply by effecting the natural juice-solid separation rapidly after crushing so that the grape skins do not remain in contact with the juice, thereby not allowing sufficient contact between the pigment constituents and the juice to result in pigment dissolution in the juice. Similarly, to effect maximum red pigment extraction heretofore, the juice was intimately mixed with the grape skins for an extended period of time after crushing and before filtering or pressing to achieve a large proportion of pigment transfer into solution in the juice. Depending upon the extent of such juice-skin contact, the resulting juice has a greater or lesser degree of the natural color of the particular grape. Thus, there are now available in commerce white, pink and red wines all of which have been obtained from the same red grape variety.

The above noted intimacy between grape skins and pulp and the pigmented constituents therein, is similarly true of the relationship between desirable varietal flavor constituents and the skins and pulp of many desirable grape varieties. Thus, the above noted pigment removal factors are similarly true of flavor removal from grape pomace. It is this close flavor and color association of the grape skins and pulp which form pomace which provides the need for this invention.

Attempts heretofore to obtain maximum color and flavor removal from grapes have been directed generally to the physical separation of the soluble constituents of the grapes from the insoluble solid fractions thereof. Methods currently in use in the wine industry attempt to effect a more perfect liquid—solid separation, that is, to obtain maximum juice yield by minimizing the residual juice content of the solid portions of the grapes separated from the juice thereof. Such methods utilize various types of mechanical and hydraulic presses in conjunction therewith which alternately apply pressure to the pomace separated from the juice in several steps, which frequently employ alternate mixing or repositioning of the pomace in the press being employed. Such mechanical procedures, while generally effective to remove some portion of the desirable color and flavor constituents from the pomace, are invariably accompanied by the removal of undesirable constituents also, which undesirable constituents adversely effect the flavor, aroma and frequently the color, of the juice thus extracted. However, such mechanical procedures also leave behind in the pomace an appreciable portion of the desirable constituents.

From the foregoing therefore it should be understood that objects of this invention include the provision of a simple and improved process for treating fruits and berries to obtain maximum color pigment and flavor constituent extraction therefrom; the provision of a sulfite treating process for effecting maximum desirable natural color and flavor constituent removal from fruits or berries with minimum associated tannin and like undesirable constituent removal therefrom; the provision of a process for treating fruit or berry pomace with a product which contains or generates sulphur dioxide in quantities sufficient to inhibit fermentation of the pomace during treatment; and the provision, as one step in a juice or wine production procedure, of the treatment of fruit or berry pomace with a solvent which contains sulphur dioxide in proportions sufficient to permit effective color and flavor constituent removal by the solvent while the sulphur dioxide inhibits fermentation of the pomace and counteracts undesirable constituent inclusion in the resulting juice or juice concentrate. These and other objects of this invention will become obvious from the following detailed disclosure.

Attempts heretofore to extract natural color and flavor constituents from grape pomace by mixing the pomace with a suitable solvent have resulted in the solution thus obtained containing those natural desirable constituents of the pomace directly in proportion to their solubility in the particular solvent employed and in inverse proportion to their affinity for the pomace solids with which they are associated. But such standard solvent treatment also results in the inclusion of bitter and astringent tannin and like undesirable contituents being taken into the solution in large proportions because they are more readily extracted from the pomace by the commonly used solvents than are the desirable flavor and anthocyanin pigment constituents. This is true irrespective of which of the frequently employed solvents is used and generally regardless of whether heat is applied during the solvent extraction procedure. Of the solvents commonly employed, water, grape spirits (brandy), wine of a suitable variety, and alcohols are commonly employed. The above disadvantageous results, however, are less true when water or wine containing a low alcoholic content is used as a solvent. However, in such instance, the desirable constituent removal is proportionately smaller also.

With the present invention, any of the above noted solvents may be employed in the subject extraction process and the addition of sulphur dioxide thereto corrects the shortcomings of previous solvent procedures by precluding the taking of the undesirable pomace tannins and like undesirable constituents into the solvent solution with the desirable constituents which are sought. The exact nature of the chemical reaction which takes places is not fully known but the sulfite treatment is known to result in a reversible altering of the chemical structure of the desirable constituents, as for example the anthocyanin pigment, making them adhere less strongly to the pomace solids and therefore more readily soluble in the solvent. After the reversibly altered constituents, such as the pigment, have been extracted from the pomace, such constituents in solution are changed to convert the same back to their original form in a suitable concentration processing step.

As noted, the exact nature of the chemical reaction which forms the basis of this invention is not fully known, nor is the status of the undesirable tannis known following the solvent-sulphur dioxide treatment of the pomace. In this latter regard, it is believed that the tannins are actually extracted into the solvent solution in proportion to the sulphur dioxide level employed in the solvent and that their undesirable characteristics are overcome by the sulphur dioxide. However, it cannot be stated definitely whether the tannin molecules are carried into solution and are irreversibly changed in character so that they no longer contribute an astringent or bitter taste to the resulting solution, or whether the desirable constituents are removed selectively and the tannin are selectively left behind in the pomace due to the presence of the sulphur dioxide in the treating solvent. In any event, however, the resulting product does not include the bitter or astringent taste characteristic of tannin containing juices obtained with heretofore known solvent treating processes. Yet, such product does include the desirable color characteristics traceable directly to the desirable pigment constituents, as well as the improved flavor and aroma characteristics traceable directly to the desirable flavor constituents of the particular grape variety being treated.

So far as is known, the reaction of the anthocyanin pigments, which are chemically defined as polyhydroxy flavylium salts, is a reversible bleaching reaction attributable directly to the inclusion of sulphur dioxide in the treating solvent. This reversible reaction effected on the pigment constituents transforms the pigment molecules, which normally hold a positive charge in their natural state, into a colorless form which is uncharged and which is readily removed from the grape pomace solids by the solvent carrying the sulphur dioxide therein. That is, the sulphur dioxide, or the bisulfite ion thereof, contacts the pomace pigment and produces the color changing reaction noted. Such reaction generally also is accompanied by varietal flavor constituent removal in a similar but not completely understood manner.

After the solvent has performed its intended function, the resulting solution is separated from the depleted and essentially colorless pomace. The sulphur dioxide is then removed from the solution and the pigment carried in the solution reverts back to its original colored form as the solution is condensed and the sulphur dioxide is removed. The remaining juice concentrate possesses true varietal color characteristics and varietal flavor characteristics but without accompanying bitter and astringent characteristics attributable to the presence of tannin. The improved flavor characteristics of the resulting concentrate become evident from tasting thereof but the presence of these flavor characteristics is not as readily determinable as is the presence of the desirable color constituents which are readily apparent upon visual inspection and comparison with the juice concentrate of similar grapes which have been treated with a conventional solvent extraction process. In this regard, the desirable sugars, acids and pigment constituents are removed from the pomace to an extent heretofore not possible with the known procedures.

An exemplary red wine production process will be briefly described, it being understood, however, that a similar process would be employed in the production of non-alcoholic grape juice concentrate, the principal difference being that fermentation at any stage of the process is not permitted in the latter case. Because red grapes are more expensive than other varieties, it is particularly important to remove as much pigment and other desirable constituents therefrom without attendant bitterness removal. Therefore, while not limited to utilization with red grape production, this invention has particular utility with respect thereto and will be described specifically with relationship to the production of a red wine.

A given quantity of red grapes are crushed in a standard crushing procedure and the natural juices thereof are separated from the pomace solids. Such separation may be effected by screening or other standard separating procedures and may be effected immediately after crushing or after some intermediate fermentation has been permitted by allowing the crushed grapes to remain in contact with the freed juices prior to pomace separation. This latter alternative is frequently employed in red wine production to permit as much natural pigment extraction and absorption into the juice as possible.

The separated pomace, sweet or dry depending upon whether it has partially fermented or not prior to its separation from the juice, is then subjected to the solvent treating step of this invention. The pomace is mixed with a solvent which includes sulfur dioxide therein in quantities sufficient to preclude fermentation of the pomace, or to arrest further fermentation thereof if it had been initially permitted prior to pomace separation.

The solvent employed may be any of those noted previously. In any event, the sulphur dioxide containing solvent and the pomace are thoroughly mixed in any standard mechanical or other suitable mixing apparatus for a predetermined period of time. The quantity of solvent employed is not critical so long as sufficient solvent is presented to the pomace to permit thorough exposure of the pomace to the solvent. The quantity of solvent employed is further determined by the fluid content of the pomace. If the pomace is treated "wet," less solvent is needed than if the pomace is pressed "dry" before treating.

If the mixing is carried out at room temperature, it may be continued for twenty-four hours or more in a commercial operation. However, upon the addition of moderate heat, the pigment and flavor constituent removal is considerably speeded up. Therefore, preferably, the mixing action is carried out in the presence of moderate heat in the range of 100° F. to 160° F. In this regard, temperatures of about 160° F. should not be exceeded; an optimum temperature of approximately 130° F. has been found highly effective. At such a moderate temperature the reaction time is reduced to about four hours or less. It should be understood that, irrespective of whether heat is applied to produce a shorter reaction time, or whether the reaction is continued for a longer period at room temperature, the effective results obtained are comparable.

Following treatment of the pomace with the solvent containing sulphur dioxide, the pomace is separated from the resulting solution and the solution is subsequently treated. In this regard, the separated pomace is essentially colorless and may be discarded if the solvent employed was water. However, if the solvent employed was alcohol or some other relatively expensive solvent, recovery of any entrapped solvent carried in the pomace is suggested. Separation of the pomace is effected in any suitable filtration apparatus of a type well known in the wine industry.

The solvent solution separated from the pomace is thereafter concentrated in a vacuum atmosphere to remove excess solvent and to remove sulphur dioxide from the resulting juice concentrate. The resulting concentrate possesses the natural color of the removed anthocyanin pigment of the grapes in direct proportion to the amount of sulphur dioxide removed therefrom by evaporation in any suitable apparatus. In this regard, by way of example, the vacuum atmosphere employed, which may vary considerably, has been found suitable when comprising 28 inches of mercury at 110° F. In the presence of such an atmosphere, solvent is readily extracted, with its contained sulphur dioxide, leaving a juice concentrate which contains all the natural color pigment and flavor characteristics of the variety of grape which was treated.

Depending upon the nature of the final product sought, the juice concentrate may be blended back with the quantity of juice, and wine made therefrom, initially removed from the crushed grapes, or it may be blended in suitable proportion with other juices or wines obtained from other grape varieties to improve their flavor and color characteristics. Alternatively, of course, if the pomace treated was a sweet pomace and if an unfermented product is desired, the concentrate may be reconstituted as a non-alcoholic fruit juice drink by the addition of suitable quantities of water thereto.

As noted, the sulphur dioxide in the solvent is present in quantities sufficient to positively arrest fermentation during the pomace treating step. In this connection when grapes are being treated in a wine making procedure of the type just described, it has been found that sulphur dioxide present in a minimum quantity of 200 parts per million (p.p.m.) is normally adequate to produce the desired results. The upper range of such sulphur dioxide content is determined to a large extent by a point of diminishing returns as to the desirable results sought, and is also attendant upon the possible danger of destroying the desirable pigment and flavor constituents sought if too much sulphur dioxide is utilized. Thus, it has been found that sulphur dioxide present in quantities greater than 2,000 p.p.m. is not suitable. By way of example, in most grape treating procedures thus far encountered, sulphur dioxide content of 1,000 p.p.m., varying 100 p.p.m. in either direction, has been found to produce highly effective results.

It should be further understood that with other fruits and berries, the above limits might require adjustment to suit a particular need. In any event, however, the critical factor is that such quantities are sufficient to inhibit fermentation at the time of pomace treatment.

In this connection, as noted previously, sulphur dioxide has been employed in wine treating procedures heretofore but for the specific and limited purpose of inhibiting wild yeast growth. In such circumstances sulphur dioxide is employed in quantities ranging from 50 to 125 p.p.m., and it has been found that such range is insufficient to produce the desirable results obtained with this invention.

The further delineate this invention, reference is directed to the following illustrative examples which describe specific treatment procedures employing the subject process. These examples describe the process carried out on laboratory scale quantities of grapes but it has been found that treatment of large commercial scale quantities can accurately be based on such examples merely by mathematically scaling up the quantities of the respective materials involved. It should further be understood that these examples are intended to be illustrative of, rather than limiting on, the subject invention.

EXAMPLE 1

A sufficient quantity of fresh ripe Ruby Cabernet grapes were crushed and pressed to obtain 1.3 gallons of fresh juice and two pounds of sweet (unfermented) pomace. The juice thus separated was pink in color and contained only a small portion of the natural Ruby Cabernet color and flavor. The pomace, however, was dark red in color and had a strong Ruby Cabernet aroma and flavor.

The separated pomace was then thoroughly mixed with one liter of fresh water containing 1,000 p.p.m. sulphur dioxide. The color of the pomace bleached out within a few minutes and the resulting solvent solution manitained its nearly water white color. After forty-five minutes the solvent solution was filtered off from the pomace, placed in a suitable flask, and evaporated in vacuo at approximately 28 inches mercury and 110° F. to a concentrated volume of 50 mls. This concentrated volume was dark red in color, had a strong natural Ruby Cabernet flavor and aroma, and no undesirable tannin characteristics.

The 50 mls. of concentrate thereafter was then added to the 1.3 gallons of fresh grape juice separated immediately after crushing. The resulting product was a dark red juice which possessed strong Ruby Cabernet character and excellent overall flavor and aroma qualities. The juice thereafter was further concentrated in a vacuum concentrator to a Ruby Cabernet concentrate of 65 degrees Balling which had excellent color, varietal character and overall quality.

By way of contrast, a similar quantity of Ruby Cabernet grapes was crushed but the free juice was allowed to stand in contact with the pomace for six hours at room temperature before being separated therefrom. The separated juice was red in color and contained desirable Ruby Cabernet characteristics but was considerably inferior in both color and flavor to the concentrate and resulting juice product to which the concentrate was added as described.

EXAMPLE 2

A quantity of Petit Sirah grapes sufficient to produce five pounds of pomace was crushed, inoculated with brewer's yeast, and allowed to ferment for one week before the pomace was separated from the juice. The five pounds of pomace separated was mixed well with two liters of water containing 2,000 p.p.m. sulphur dioxide and the mixture was allowed to stand at room temperature for eight hours. Thereafter, the water solution was filtered off and concentrated in vacuo as in Example 1 to exactly 100 mls. The resulting concentrate was dark red in color and possessed no undesirable flavor or aroma characteristics. The 100 mls. of concentrate was then added to a pink wine and changed the color of such wine to a dark red without altering detrimentally the characteristic flavor of such wine.

EXAMPLE 3

The general procedure of Example 2 was repeated, substituting, however, neutral grape brandy (190° proof) containing 2,000 p.p.m. sulphur dioxide as a solvent in place of water. The 100 mls. of concentrate obtained following mixing and standing was even more desirable in natural Petit Sirah color and flavor than the concentrate obtained in Example 2. The color in the final product was about 30% more dense and no adverse astringent flavor characteristics were noted therein.

EXAMPLE 4

A sufficient quantity of fresh grapes of the variety of Carignane was crushed and pressed to produce two pounds of sweet "wet" pomace containing approximately 80% moisture. The pomace was promptly separated and thoroughly mixed with 350 mls. of neutral grape brandy (190° proof) containing 500 p.p.m. sulphur dioxide. After four hours, the solvent solution was separated from the pomace by filtration and concentrated in vacuo as in Example 1 to yield 200 mls. of a dark red concentrate having little or no flavor but highly desirable color characteristics typical of Carignane grapes.

EXAMPLE 5

Twenty pounds of fresh blackberries were crushed and allowed to ferment for seven days, after three pounds of corn sugar and two gallons of water had been added thereto to assist fermentation in known fashion. Two pounds of "dry" pomace were separated by pressing, to which were added and mixed 500 mls. of N-propanol containing 200 p.p.m. sulphur dioxide. After four hours, the liquid solution was filtered off and evaporated in vacuo as in Example 1 to yield 200 mls. of a very dark red concentrate which possessed a clean blackberry flavor, without the attendant astringency normally associated with blackberry juice and concentrates thereof.

By way of further specific example, the effectiveness of the below listed solvents containing sulphur dioxide in varying porportions and those not containing any sulphur dioxide are set out in the following tabular example.

EXAMPLE 6

One liter of each of the below listed solvents was mixed with two pounds of fresh red pomace obtained by crushing a sufficient quantity of Zinfandel grapes. The listed solvent was mixed with the separated pomace in each case and the mixture was allowed to stand for six hours before the solvent solution was filtered off, concentrated and analyzed. A comparison of the respective concentrates was made on the basis of color and flavor intensity after each sample was concentrated in vacuo, as in Example 1, to exactly 100 mls. which was then added to 900 mls. of a neutral white wine having a pH of 3.2. The results of these comparative tests is set out in the following table; in which desirable color intensity is indicated by increasing numerical scale and desirable flavor intensity is measured by increased numbers of + indicia:

| Solvent used | Resultant color | Flavor intensity |
| --- | --- | --- |
| (A) Ethanol +1,000 p.p.m. sulphur dioxide | 80 | +++++ |
| (B) Propylene Glycol +500 p.p.m. sulphur dioxide | 40 | +++++ |
| (C) Water +1,000 p.p.m. sulphur dioxide | 40 | ++ |
| (D) Ethanol, without sulphur dioxide | 40 | ++ |
| (E) Propanol, without sulphur dioxide | 36 | ++ |
| (F) Water, without sulphur dioxide | 15 | + |
| (G) Ethanol +0.1% HCl | 60 | Bitter |
| (H) Water +0.1% HCl | 40 | Bitter |

Each of the concentrates thus produced was stored in a closed container at 130° F. It was found that those samples which used 0.1% HCl solvent solutions for extraction were unstable and turned brown after only two days. The other samples with which sulphur doxide had not been used were brown and had lost most of their desirable flavor after three weeks, while the samples treated with sulphur dioxide retained their red color and were still relatively free from off flavor and aroma after four weeks. Weak hydrochloric acid solvent solutions have heretobefore been employed in pigment removal procedures, but with attendant undesirable flavor results as noted.

The ratio of solvent to pomace employed with this process, as previously noted, is not generally critical although a ratio of one to one by weight normally produces suitable results. However, if the pomace has been pressed substantially "dry" during its separation from the juice, a greater proportional solvent to pomace ratio is required while if the pomace is separated "wet" (having a high proportion of liquid) less solvent is required. A suitable range, depending upon the "dry" or "wet" nature of the pomace being treated, varies from one part pomace for each four parts solvent for very dry pomace treatment, to three parts pomace for each one part solvent, for very wet pomace treatment.

Having thus made a full disclosure of the improved fruit and berry treating process of this invention, reference is directed to the appended claims for the scope of protection to be afforded thereto. As used in such claims, reference to "fruits" is also intended to include berries which are amenable to treatment with the disclosed process.

We claim:
1. A process of treating fruit to extract maximum natural color and flavor constituents therefrom, comprising
    (A) crushing a quantity of fruit to free natural juices therefrom,
    (B) separating such juices from the pomace of said fruit,
    (C) treating said pomace with a solvent containing sulphur doxide in sufficient quantities to preclude ferentation of said pomace during such treatment,
        (1) said solvent during such treatment removing into solution the desirable varietal color and flavor constituents carried in said pomace,
    (D) separating said sovent solution with said removed constituents therein from the treated pomace, and thereafter,
    (E) concentrating said solvent solution to remove said solvent and sulphur dioxide therefrom to obtain a juice concentrate which contains said desirable natural color and flavor constituents therein.
2. The process of claim 1 which includes the further step of
    (F) blending said juice concentrate in predetermined amounts with said separated fruit juices for further processing thereof together,
    whereby enhanced color and flavor characteristics are imparted to said juices without attendant addition thereto of undesirable characteristics.
3. The process of claim 1 in which said pomace treatment is carried out in the presence of moderate heat and with thorough mixing.
4. The process of claim 1 in which said fruit comprises grapes, and in which said solvent contains sulphur dioxide therein in quantities of at least approximately 200 p.p.m.

5. A process of sulfite treating pigmented fruits to obtain maximum natural color pigment and flavor constituent removal therefrom, comprising
    (A) crushing a quantity of such fruit to free the natural juices therefrom,
    (B) separating such juices from the pigmented pomace of said fruit,
    (C) treating said pomace with a solvent while thoroughly mixing said pomace therewith,
        (1) said solvent including sulphur dioxide in amounts sufficient to inhibit fermentation of said pomace and undesirable constituent removal while said desirable color pigment and flavor constituents are carried into solution by said solvent
        (2) such extraction being accompanied by transformation of said pomace into a generally colorless state and generally without attendant color change of said solvent solution,
    (D) separating said generally colorless pomace from said solvent solution, and thereafter
    (E) concentrating said solvent solution in a vacuum to remove by evaporation a predetermined amount of said solvent with its contained sulphur dioxide to provide a juice concentrate,
        (1) such sulphur dioxide removal being accompanied by the return of the natural color of said pigment to said concentrate so that said concentrate possesses the desirable natural color and flavor characteristics of said pomace without accompanying undesirable flavor characteristics thereof.
6. The process of claim 5 in which said fruit comprises fresh grapes, and in which said sulphur dioxide is present in said solvent in quantities constituting at least approximately 200 p.p.m.
7. The process of claim 5 in which said fruit comprises fresh grapes to be used in making wine, said process further including
    (F) blending said concentrate in predetermined quantities with the juices previously separated from said pomace to enhance the color and flavor characteristics thereof.
8. The process of claim 7 in which
    (G) said pomace is separated from said natural juices after some fermentation has been initiated therein,
    (H) said solvent including sulphur dioxide in quantities within the range of about 800 p.p.m. to about 1,200 p.p.m. to insure preclusion of further fermentation of said pomace during color and flavor constituent removal therefrom.

References Cited

UNITED STATES PATENTS

| | | | |
|---|---|---|---|
| 1,167,006 | 1/1916 | Monti | 99—105 XR |
| 3,307,954 | 3/1967 | Blakemore | 99—154 |

FOREIGN PATENTS 864,177  31961  Great Britain.

RAYMOND N. JONES, Primary Examiner

J. M. HUNTER, Assistant Examiner

U.S. Cl. X.R.

99—35, 100, 103, 155